United States Patent [19]

Hirota et al.

[11] Patent Number: 4,536,795
[45] Date of Patent: Aug. 20, 1985

[54] VIDEO MEMORY DEVICE

[75] Inventors: Akira Hirota, Chigasaki; Hiroyuki Miyahara, Yokohama; Yoshiteru Kosaka, Zushi, all of Japan

[73] Assignee: Victor Company of Japan, Ltd., Japan

[21] Appl. No.: 463,934

[22] Filed: Feb. 4, 1983

[30] Foreign Application Priority Data

| Feb. 4, 1982 [JP] | Japan | 57-16647 |
| Feb. 4, 1982 [JP] | Japan | 57-16648 |
| Feb. 4, 1982 [JP] | Japan | 57-16649 |
| Feb. 4, 1982 [JP] | Japan | 57-16650 |

[51] Int. Cl.$^3$ .................. H04N 5/14; H04N 3/14
[52] U.S. Cl. ...................... 358/160; 358/213
[58] Field of Search ............ 358/148, 153, 160, 213; 365/45

[56] References Cited

U.S. PATENT DOCUMENTS

| 3,856,989 | 12/1974 | Weimer | 358/213 |
| 4,127,877 | 11/1978 | Morishita et al. | 358/213 |
| 4,225,947 | 9/1980 | Councill et al. | 365/45 |
| 4,245,252 | 1/1981 | Nagumo | 358/213 |

FOREIGN PATENT DOCUMENTS

| 1412463 | 12/1975 | United Kingdom . |
| 1516744 | 7/1978 | United Kingdom . |
| 1533833 | 11/1978 | United Kingdom . |
| 1550463 | 8/1979 | United Kingdom . |

OTHER PUBLICATIONS

Electroniker, 1978, No. 3, pp. EL7-EL15.
Electronikpraxis, 1978, No. 12, pp. 22-30.
"Charge Transfer Devices" by Carlo Sequin & Michael F. Tompsett, 1975, Academic Press Inc., pp 243-247.

Primary Examiner—Tommy P. Chin
Assistant Examiner—Michael D. Parker
Attorney, Agent, or Firm—Andrus, Sceales, Starke & Sawall

[57] ABSTRACT

A video memory device comprises an analog memory part in which memory elements are arranged in a matrix form with a plurality of rows and a plurality of columns, for storing an input analog video signal, an input circuit for applying the input analog video signal to the analog memory part and causing the analog memory part to store the input analog video signal, and an output circuit for obtaining an analog video signal delayed by a predetermined delay time from the analog memory part.

8 Claims, 10 Drawing Figures

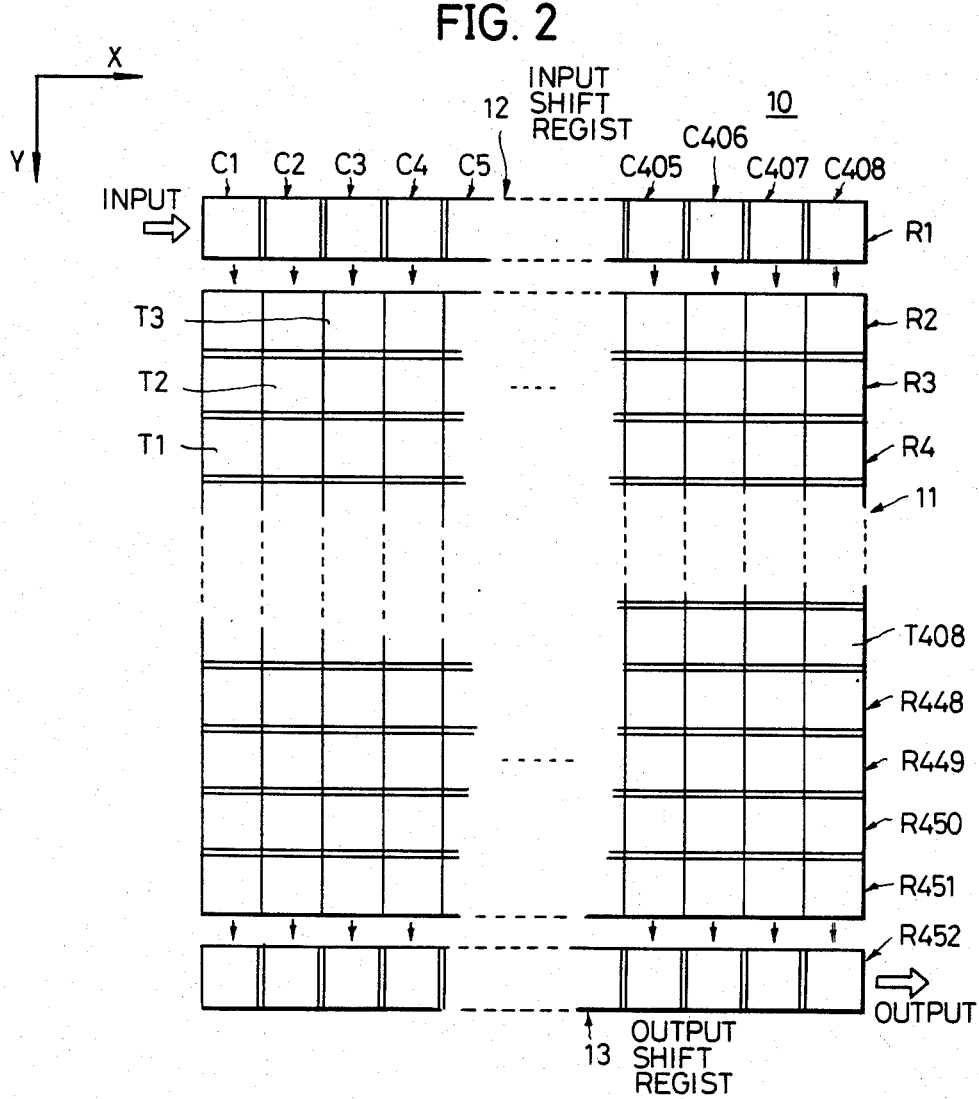

VIDEO MEMORY DEVICE

BACKGROUND OF THE INVENTION

The present invention generally relates to video memory devices, and more particularly to a video memory device comprising semiconductors for storing or memorizing one field or one frame of video signal. For example, a delay device is a device for temporarily storing a signal and reading out and producing the stored signal after a predetermined time period has elapsed, and a solid-state image sensing device is a device in which a signal subjected to photoelectric conversion is temporarily stored and the stored signal is successively read out. Accordingly, the device referred to as the video memory device in the present specification also includes such devices.

Generally, video information in terms of frame periods of a video signal is extremely similar, and the correlation among frames is quite high. On the other hand, there is almost no correlation among frames with respect to noise included within the video signal. Hence, if the video signal is averaged in terms of frame periods, the energy of the signal component of the video information hardly changes while only the energy of the noise component decreases, and noise suppression is carried out as a result. A noise suppression circuit for carrying out such a noise suppression, is designed to carry out subtraction between the video signal and a signal obtained by delaying the video signal by one frame, and then carry out subtraction between the subtracted result and the video signal. Thus, in this type of a noise suppression circuit, it is necessary to use a one-frame delay device.

The conventional noise suppression circuit was designed as a recursive filter comprising a one-frame delay circuit. In this conventional circuit, it was necessary to provide an analog-to-digital (A/D) converter for converting the input video signal which is an analog signal into a digital signal and a digital-to-analog (D/A) converter for converting an output digital signal into an analog signal. Further, the one-frame delay circuit was constituted by a frame memory for storing one frame of the digital signal obtained from the A/D converter.

For example, when converting a video signal having a field frequency 60 Hz by the A/D converter with a sampling frequency $4f_{sc}$ (where $f_{sc}$ is a chrominance subcarrier frequency and equal to 3.579545 MHz, for example) into a digital signal with a quantization number of eight bits, and storing this converted signal into the frame memory, the number of bits required in the frame memory becomes an excessively large number as follows.

$$4 \times 3.579545 \times 8 \times 1/30 = 3.818 \text{ Mbits}$$

Hence, if this frame memory is constituted from a 64-Kbit random access memory (RAM), sixty of such RAMs become necessary. Accordingly, the conventional delay circuit required a large number of RAMs, and the cost of the circuit became high and the size of the circuit became large. In addition, because the costs of the A/D converter and the D/A converter are high, there was a disadvantage in that the cost of the noise suppression circuit became high and the size of the noise suppression circuit became large.

On the other hand, 1H-delay elements are known and reduced to practice, for delaying the video signal by one horizontal scanning period (1H) by use of charge-coupled devices (CCDs). Hence, it is possible to design a delay device for delaying the video signal by one frame, by connecting 525 of such 1H-delay elements in series. However, the 1H-delay element comprises N (N is an integer) stages of CCDs, and when signal charges are transferred serially through the 525 1H-delay elements, the transfer number becomes equal to 525N which is an exceedingly large number. Morover, because the transfer efficiency is not 100%, the signal becomes attenuated during this exceedingly large number of transfer. As a result, the signal-to-noise (S/N) ratio of the signal finally obtained after the delay of one frame is extremely degraded, and cannot be used for practical purposes. Therefore, the delay device having such a design could not be used for practical purposes.

Recently, accompanied by the rapid development in the field of semiconductor technology, there has been an active development in solid-state image sensing devices which do not use electron beams. Compared to the image sensing device employing the image pickup tube, the solid-state image sensing device is smaller in size and lighter in weight, and the power consumption is small because the required voltage is low. Further, the solid-state image sensing device is advantageous in that the solid-state image sensing device is strong in resisting mechanical shocks or vibrations, the serviceable life of the device is long providing high reliability, and there is no need to subject the device to baking. However, during the manufacturing stage of the solid-state image sensing device, inferior image sensor parts are easily produced, and the yield rate becomes a serious problem. Hence, there was a disadvantage in that the manufacturing cost of one solid-state image sensing device became high.

Conventionally, when the image sensor part is inferior, such an inferior image sensing device could not be used as the image sensing device and was destroyed as an inferior product. However, if such inferior products may be used for other purposes so that such inferior products are effectively used, the manufacturing cost of the solid-state image sensing device may be reduced as a result.

On the other hand, image sensor cameras built-in with recording and reproducing apparatuses are being developed for practical use, and in such cameras, there is a demand for compact size, simple construction, and low cost.

SUMMARY OF THE INVENTION

Accordingly, it is a general object of the present invention to provide a novel and useful video memory device in which the above described demands have been satisfied.

Another and more specific object of the present invention is to provide a video memory device capable of finely storing one frame or one field of picture without attenuation in the signal. According to the device of the present invention, the signal is serially transferred horizontally only at an input part and an output part, for example, and the signal is transferred in parallel vertically between the input and output parts. Hence, the number of signal transfer is small, and there is almost no signal attenuation. In addition, according to the device of the present invention, the video information is stored as it is in the form of an analog signal. Thus, it is unnecessary to provide A/D and D/A converters as in the conventional devices, and as a result, the cost and size of the device can be reduced.

Still another object of the present invention is to provide a video memory device suited for use as a one-frame delay circuit which is employed in a noise suppression circuit using correlation between frames of the video signal. According to the device of the present invention, it is possible to manufacture the noise suppression circuit having a simple construction at low cost, due to the features described heretofore.

Another object of the present invention is to provide a video memory device which may be used as a solid-state image sensing device. When the video memory device is not used as the solid-state image sensing device, or in a case where the video memory device cannot be used as the solid-state image sensing device because of an inferior image sensor part, the device is used as a video memory device.

Still another object of the present invention is to provide a video memory device capable of being selectively switched to carry out an operation as a delay device and an operation as a solid-state image sensing device. In the present invention, the video memory device is used as the solid-state image sensing device during a recording mode, and used as a delay device during a reproducing mode. The device according to the present invention is especially effective when applied to an image sensor camera built-in with a recording and/or reproducing apparatus. According to the device of the present invention, there is no need to separately provide the solid-state image sensing device and the one-frame delay device for the noise suppression circuit in the above image sensor camera, and for this reason, the construction of the image sensor camera can be simplified and the manufacturing cost of the camera can be reduced.

Other objects and further features of the present invention will become apparent from the following detailed description when read in conjunction with the accompanying drawings.

BRIEF DESCRIPTION OF THE DRAWINGS

FIG. 2 is a diagram, with a part omitted, showing an embodiment of constitution of cells of the video memory device shown in FIG. 1;

DETAILED DESCRIPTION

Figure 1:
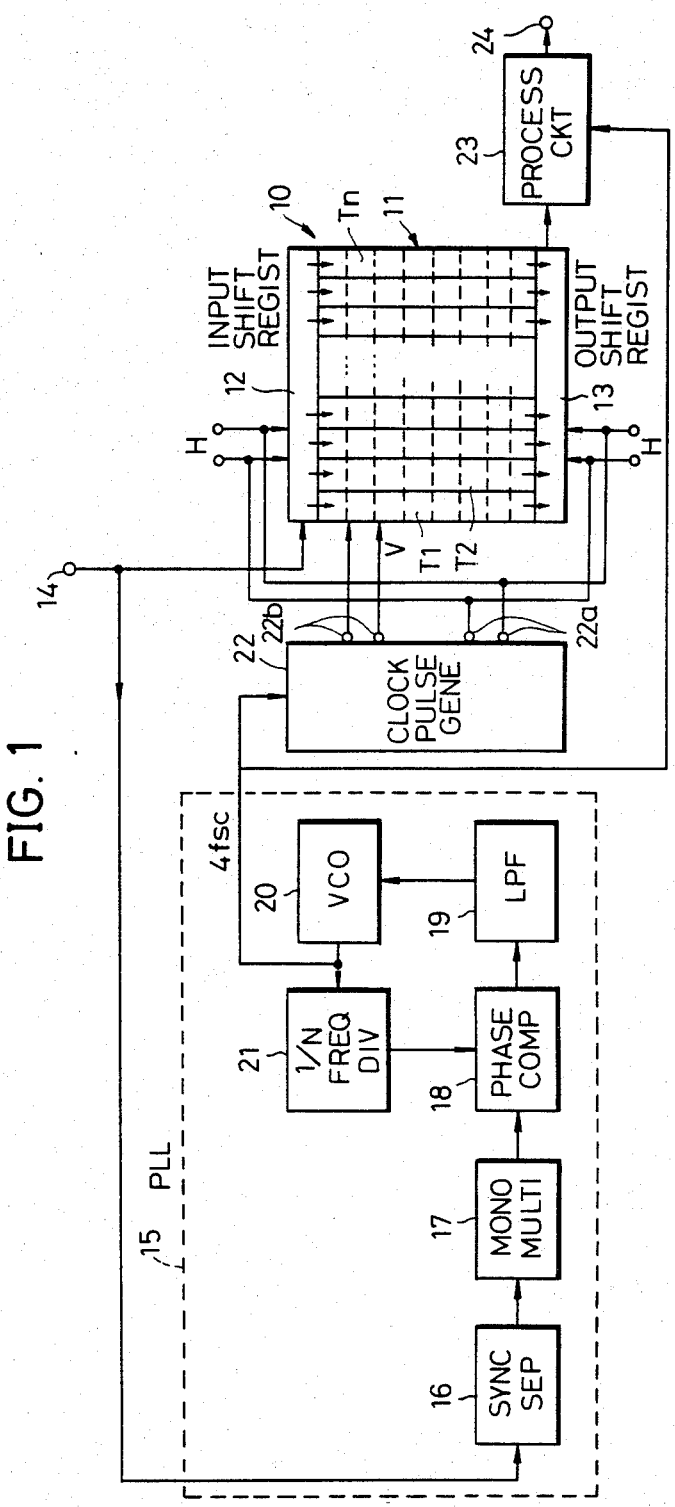
FIG. 1 is a systematic block diagram showing a first embodiment of a video memory device according to the present invention used as a one-frame delay device.

First, description will be given with respect to an embodiment of a video memory device according to the present invention by referring to FIG. 1, where the video memory device is used as a one-frame delay device. A video memory device 10 comprises a vertical transfer part 11 used as a main memory device body, an input shift register 12 of a serial-input and parallel-output type, and an output shift register 13 of a parallel-input and serial-output type. The vertical transfer part 11 comprises m-row by n-column cells (m and n are integers), and n rows of vertical transfer parts are indicated by T1 through Tn in FIG. 1. In an embodiment which will be described hereinafter in conjunction with FIG. 2, m rows correspond to 450 rows (R2 through R451) and n columns correspond to 408 columns (C1 through C408).

A composite video signal applied to an input terminal 14 is supplied to the input shift register 12, and also supplied to a synchronizing signal separating circuit 16 within a phase locked loop (PLL) 15. A composite synchronizing signal separated from the composite video signal at the synchronizing signal separating circuit 16, is supplied to a monostable multivibrator 17 wherein equalizing pulses are eliminated and the separated composite synchronizing signal is converted into a pulse having a horizontal scanning period. The output pulse of the monostable multivibrator 17, having the horizontal scanning period, is supplied to a phase comparator 18 wherein the phase of the output pulse is compared with the phase of a signal from a 1/N-frequency divider (N is an integer) 21, having a frequency equal to the horizontal scanning frequency. An output phase error voltage of the phase comparator 18 is supplied to a lowpass filter 19 wherein an unwanted frequency component is eliminated, and an output of the lowpass filter 19 is applied to a voltage controlled oscillator (VCO) 20 as a control voltage to control the oscillation frequency of the VCO 20. The center frequency of the output oscillation frequency of the VCO 20 is equal to $4f_{sc}$ (where $f_{sc}$ is the chrominance subcarrier frequency and equal to 3.579545 MHz in the NTSC system). The oscillation output of the VCO 20 is applied to the 1/N-frequency divider 21 and frequency-divided by 1/N into the horizontal scanning frequency, and then supplied to the phase comparator 18. A loop formed by a sequence from the above phase comparator 18 reaching the phase comparator 18 again through the lowpass filter 19, VCO 20, and 1/N-frequency divider 21, operates to reduce the output phase error of the phase comparator 18 to zero. As a result, the output oscillation frequency signal of the VCO 20 is in phase synchronism with the horizontal synchronizing signal of the input composite video signal. Accordingly, if the input composite video signal is a reproduced signal from a recording and reproducing apparatus and comprises a time base fluctuation component, the output signal of the VCO 20 will also include the same time base fluctuation component.

The output signal of the VCO 20 is also supplied to a clock pulse generator 22 and a processing circuit 23. The clock pulse generator 22 generates a clock pulse for horizontal transfer and a clock pulse for vertical transfer, in response to the output signal of the VCO 20. The clock pulse for horizontal transfer thus generated by the clock pulse generator 22 is obtained through an output terminal 22a, and supplied to the input shift register 12 and the output shift register 13. On the other hand, the clock pulse for vertical transfer thus generated by the clock pulse genrator 22 is obtained through an output terminal 22b, and supplied to the vertical transfer part 11.

An embodiment of constitution of cells of the memory device 10 is shown in FIG. 2. In the embodiment shown, the memory device 10 comprises 408 cells C1 through C408 for one column along a horizontal direction (X) and 452 cells R1 through R452 for one row along a vertical direction (Y). Hence, the cells are arranged two-dimensionally in a 452-row by 408-column matrix form. The 408 cells in the first row R1 constitute the input shift register 12. The second row R2 through the 451st row R451 respectively comprise 408 cells, and constitute the vertical transfer part 11. The 452nd row R452 which is the last row also comprise 408 cells, and constitute the output shift register 13. The above cells are constituted by charge-coupled devices (CCDs). In the input shift register 12, the cell in the first column C1 is serially applied with the video signal of the analog signal form at the input side thereof. In the output shift register 13, the cell in the 408th column C408 serially produces the delayed signal at the output side thereof.

Figure 3A:
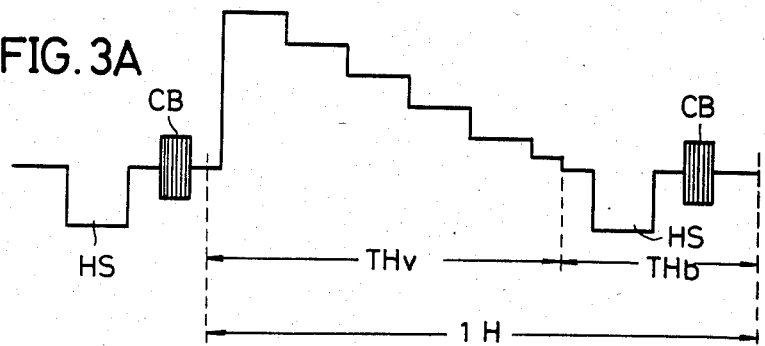
FIGS. 3A and 3B are graphs respectively showing a signal waveform of one horizontal scanning period of a composite video signal and a signal waveform showing a sampled and transferred signal.
Figure 3B:
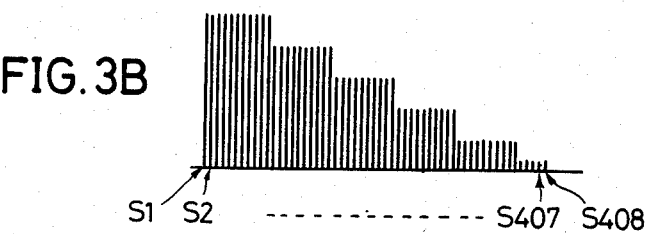
Figure 4A:
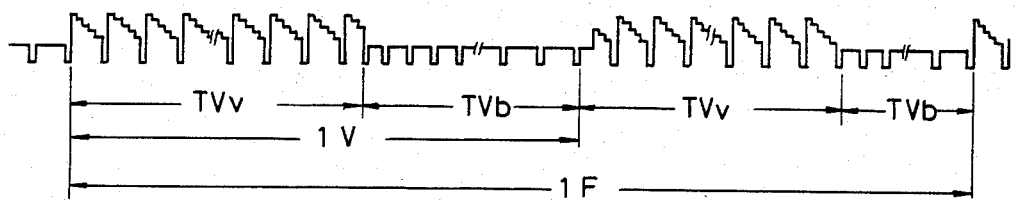
FIGS. 4A and 4B are graphs respectively showing a signal waveform of one frame period of a composite video signal and a signal waveform of a sampled and transferred signal.
Figure 4B:
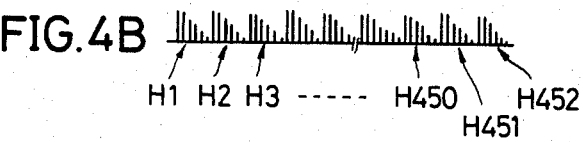

It will now be assumed that the composite video signal applied to the input terminal 14 is a signal having a horizontal scanning period waveform shown in FIG. 3A and a vertical scanning period waveform shown in FIG. 4A, for example. In FIG. 3A, HS designates the horizontal synchronizing signal, CB designates the color burst signal, THv designates the video information period, THb designates the horizontal blanking period, and 1H designates one horizontal scanning period. In FIG. 4A, TVv designates the video information period within one vertical scanning period (1V), and TVb designates the vertical blanking period. The input register 12 successively samples the input video signal by the clock pulse for horizontal transfer obtained from the clock pulse generator 22, and transfers the sampled signals from the cell C1 to the cells C2, C3, . . . C408. If the sampled signals are designated by S1, S2, . . . S407, and S408 as shown in FIG. 3B according to the sampling order, the signals are successively transferred horizontally within the video information period THv by the clock pulse for horizontal transfer in this order. The clock pulse for horizontal transfer is not generated during the horizontal blanking period THb, and the signals are not transferred further horizontally and respectively maintained within the 408 cells in the input shift register 12. In this state, the signal S1 is stored and maintained in the cells in the column C408, the signal S2 is stored and maintained in the cells in the column C407, . . . the signal S407 is stored and maintained in the cells in the column C2, and the signal S408 is stored and maintained in the cells in the column C1, and the transfer of the first one horizontal scanning period (1H) is completed in this state.

The clock pulse for vertical transfer is generated by the clock pulse generator 22 during the above horizontal blanking period THb, and the electric charges of the signals S1 through S408 maintained within each of the cells constituting the row R1 of the input shift register 21 are simultaneously transferred vertically to each of the corresponding 408 cells in the row R2 as indicated by arrows in FIG. 2.

Similarly, during the next horizontal scanning period, the sampled signals are successively transferred horizontally into the 408 cells in the input shift register 12 within the video information period THv. Next, during the horizontal blanking period THb, the electric charges maintained within the 408 cells in the row R2 are simultaneously transferred vertically to each of the corresponding 408 cells in the row R3, by the clock pulse for vertical transfer. At the same time, the horizontal transfer is completed with respect to the 408 cells in the input shift register 12, and the electric charges maintained in each of the cells in the row R1 are simultaneously transferred vertically to each of the corresponding 408 cells in the row R2.

Thereafter, similar operations are successively and repeatedly carried out, and the electric charges in each row are successively transferred vertically to succeeding rows within the horizontal blanking period THb with a 1H period. Finally, the electric charges are transferred vertically to the row R452 from the row R451. Accordingly, signals H1, H2, . . . H450, and H451 in terms of the video information period within one horizontal scanning period shown in FIG. 3B, are successively stored and maintained within each of the cells in the rows R452, R451, . . . , R2, and R1. Each of the signals S1 through S408 of the signal H1 transferred vertically into each of the cells in the row R452 constituting the output shift register 13, are successively transferred horizontally by the clock pulse for horizontal transfer obtained from the clock pulse generator 22, and successively obtained serially. Similarly thereafter, the signals H2, H3, . . . are transferred vertically to the row R452 constituting the output shift register 13, and the signals S1 through S408 of the signals H2, H3, . . . are successively and serially obtained horizontally.

The above described vertical transfer is carried out during the video information period TVv in each of the vertical scanning periods, and is not carried out during the vertical blanking period TVb.

The time required from the time when the above signal H1 is applied to the input shift register 12 until the time when the signal is obtained from the output shift register 13, is substantially equal to one frame period (1F) as shown in FIG. 4A (that is, two field period or 1/30 seconds). Accordingly, the video signal applied to the input shift register 12 is delayed by one frame period at the memory device 10, and then obtained from the output shift register 13.

If the clock pulse frequency for the horizontal transfer is assumed to be equal to 7.16 MHz, for example, the video information period THv and the horizontal blanking period THb shown in FIG. 3A become as follows because one horizontal scanning period is equal to 63.5 μsec.

$$TH v = 408 \times [1/(7.16 \times 10^6)] = 56.98 \times 10^{-6} \text{ (sec)}$$

$$TH b = 63.5 - 56.98 = 6.52 \text{ (}\mu\text{sec)}$$

In addition, because one vertical scanning period is equal to 16.6 msec, the video information period TVv and the vertical blanking period TVb shown in FIG. 4A become as follows.

$$TV v = 226 \times 63.5 = 14.35 \text{ (msec)}$$

$TVb = 16.6 - 14.35 = 2.31$ (msec)

The video signal delayed by one frame period and obtained from the output shift register 13, is supplied to the processing circit 23. Because the horizontal synchronizing signal, color burst signal, vertical synchronizing signal, equalizing pulse, and the like are not stored in the memory device 10, these signals are not included within the output signal of the output shift register 13. Hence, the horizontal and vertical synchronizing signals, equalizing pulse, color burst signal, and the like formed from the output oscillation signal of the VCO 20, are added to the output delayed video signal of the output shift register 13 at the processing circuit 23. Accordingly, the output signal of the processing circuit 23 is obtained as a composite color video signal delayed by one frame period from an output terminal 24.

As described before, the output of the VCO 20 includes a time base fluctuation component corresponding to the time base fluctuation component within the input composite video signal, and the output clock pulse of the clock pulse generator 22 also comprise a time base fluctuation component. Thus, the input signal is delayed within the memory device 10 so that the video signal obtained is eliminated of the time base fluctuation component.

When the memory device 10 is to be used as a one-field (1/60 sec) delay circuit, the frequency of the clock pulse for vertical transfer generated by the clock pulse generator 22 is set to a frequency higher than the frequency used in the above described case. Moreover, the input signal is transferred within the video information period TVv, and produced from the output shift register 13.

According to the device of the present invention, the input composite video signal is applied to the device as it is in the form of an analog signal, and produced therefrom after being delayed. Hence, there is no need to use A/D and D/A converters, and the size of the delay device may be reduced and the device may be manufactured at low cost. In addition, although the signals are serially transferred within the input and output shift registers 12 and 13, the signals are transferred in parallel within the vertical transfer part 11 and between the vertical transfer part 11 and the input and output shift registers 12 and 13. As a result, the number of transfer is small and degradation introduced in the signal is exceedingly small, to enable fine signal delay.

Figure 5:
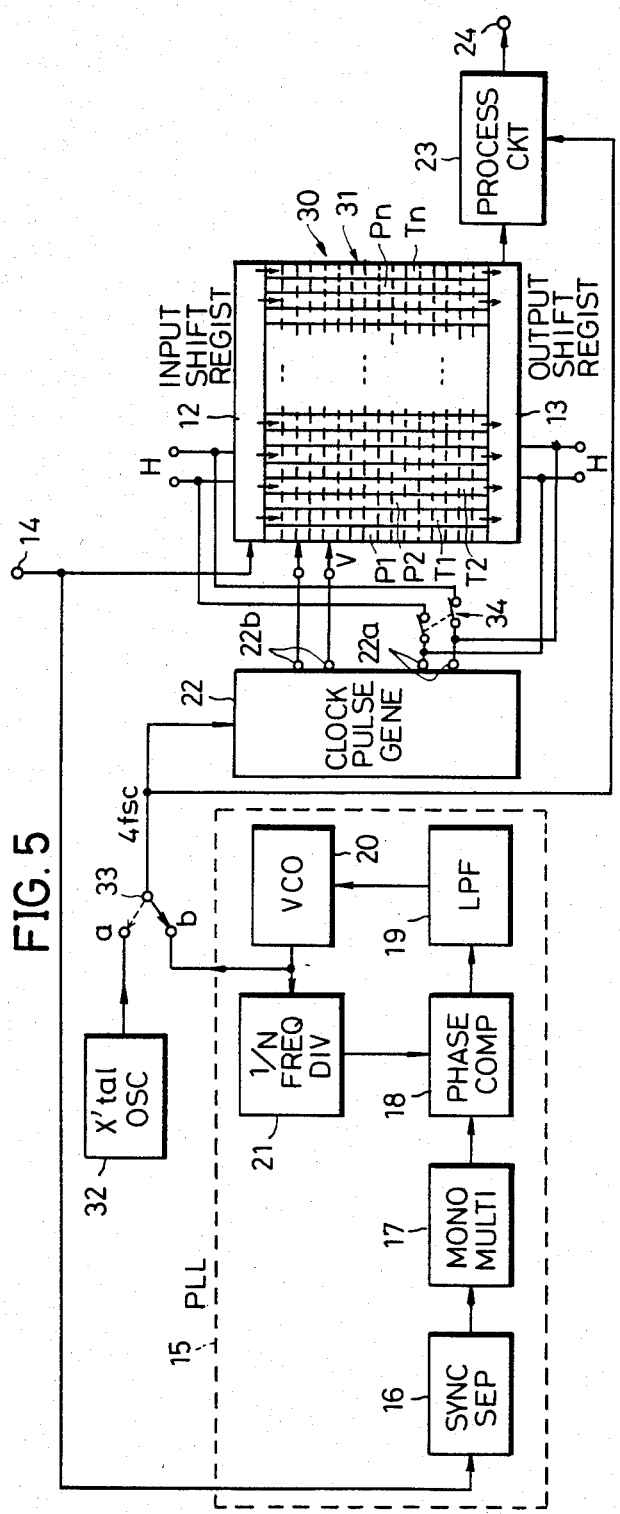
FIG. 5 is a systematic block diagram showing a second embodiment of a video memory device according to the present invention which is selectively switched and used so as to carry out an operation as a one-frame delay device and an operation as a solid-state image sensing device.
Figure 6:
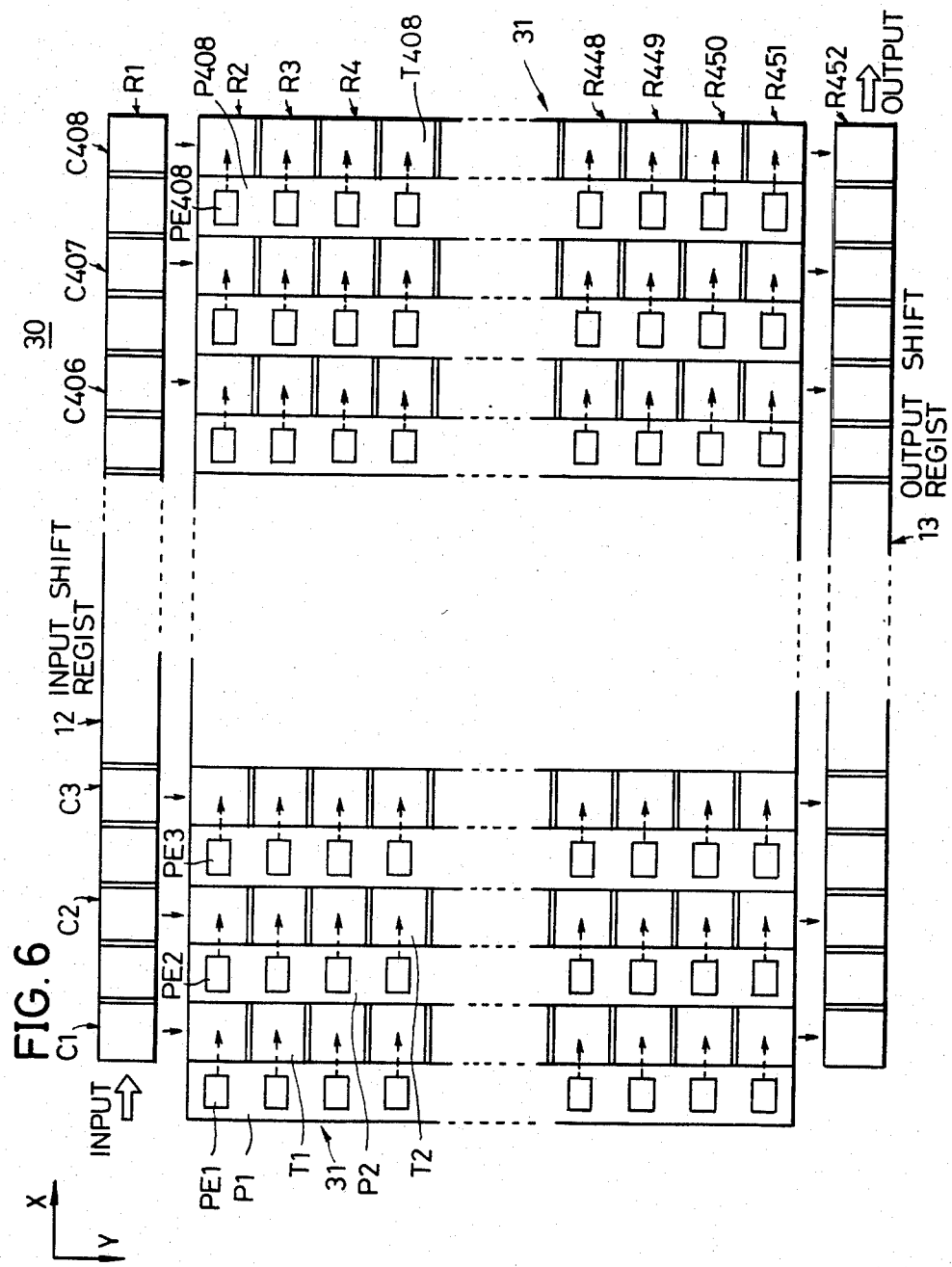
FIG. 6 is a diagram, with a part omitted, showing an embodiment of constitution of cells of the video memory device shown in FIG. 5.

Next, description will be given with respect to a second embodiment of the memory device according to the present invention by referring to FIGS. 5 and 6. In FIGS. 5 and 6, those parts which are the same as those corresponding parts in FIGS. 1 and 2 are designated by the same reference numerals, and their description will be omitted.

As shown in FIG. 5, a memory device 30 comprises the input shift register 12, output shift register 13, and a main memory device body 31 in which image sensor parts P1, P2, ... Pn and vertical transfer parts T1, T2, ... Tn are alternately arranged.

An embodiment of constitution of cells of the memory device 30 is shown in FIG. 6. In the embodiment shown in FIG. 6, the image sensor parts and the vertical transfer parts within the main memory device body 31 respectively comprise 450-row by 408-column cells. The image sensor parts P1 through P408 respectively comprise 408 photoelectric converting elements PE1, PE2, ... PE408, for each of the rows from the second row R2 through the 451st row R451. Accordingly, 408 photoelectic converting elements for one row in the horizontal direction (X) and 450 photoelectric converting elements for one column in the vertical direction (Y), which constitute picture elements, are arranged in a matrix form. Similarly, 408 cells for one row in the horizontal direction and 450 cells for one column in the vertical direction are respectively arranged in a matrix form with respect to the vertical transfer parts T1 through Tn. The input shift register 12 constituted by the first row R1 and the output shift register 13 constituted by the last row R452, respectively comprise 408 cells as in the previous embodiment.

In FIG. 5, the oscillation output having the frequency $4f_{sc}$ of the VCO 20 within the PLL 15, is supplied to the 1/N-frequency divider 21, and also applied to a contact b of a switch 33. An oscillation output having the frequency $4f_{sc}$ of a crystal oscillator 32, is applied to a contact a of the switch 33. A moving contact of the switch 33 is switched over and connected to the contact a or b, and the signal having the frequency $4f_{sc}$ which passes through the switch 33 is supplied to the clock pulse generator 22 and the processing circuit 23. An open-and-close switch 34 is provided in a system path through which the clock pulse for horizontal transfer obtained from the output terminal 22a of the clock pulse generator 22 passes before reaching the input shaft register 12.

Description will now be given for a case where the memory device 30 is used as a solid-state image sensor element. In this case, the movable contact of the switch 33 is switched over and connected to the contact a, and the switch 34 is opened. Hence, the oscillation output having the frequency $4f_{sc}$ obtained from the crystal oscillator 32 is applied to the clock pulse generator 22 through the switch 33, and the clock pulse generator 22 generates the clock pulse for horizontal transfer through the output terminal 22a and the clock pulse for vertical transfer through the output terminal 22b. Because the switch 34 is open, the clock pulse for horizontal transfer is not supplied to the input shift register 12, and is only supplied to the output shift register 13. The clock pulse for vertical transfer is applied to the vertical transfer part within the main memory device body 31.

When the main memory device body 31 receives light from an object (not shown), the image sensor parts P1 through P408 carry out photoelectric conversion. Signal electric charges thus obtained by the photoelectric conversion are respectively transferred to adjacent vertical transfer parts T1 through T408 from the image sensor parts P1 through P408 as indicated by broken arrows in FIG. 6, by a gate pulse obtained from the clock pulse generator 22. Thereafter, the signal electric charges in each of the rows R2 through R451 of the vertical transfer parts T1 through T408 are successively transferred vertically in terms of each row, by the clock pulse for vertical transfer obtained from the clock pulse generator 22. The signal electric charges transferred to the output shift register 13 are transferred horizontally by the clock pulse for horizontal transfer obtained from the clock pulse generator 22, and obtained as a video signal from the cells in the 408th column which constitute the output side.

The above photoelectric conversion and the transfer of the signal electric charges to the vertical transfer parts from the image sensor parts take place during the vertical blanking period of the composite video signal.

In addition, the vertical transfer of the signal electric charges in the vertical transfer parts take place during the horizontal blanking period. Accordingly, the video signal obtained from the output shift register 13 only exists during the video information period of the composite video signal. The horizontal and vertical synchronizing signals, color burst signal, equalizing pulse, and the like are added to the output video signal thus obtained at the processing circuit 23, and a composite video signal obtained by the image sensor is produced through the output terminal 24. If the input shift register 12 is not operated to operate the memory device 30 as a solid-state image sensor element, the operation of the memory device 30 is the same as the conventional solid-state image sensor element.

When the memory device 30 is to be used as a delay device, the movable contact of the switch 33 is switched over and connected to the contact a and the switch 34 is closed. a reproduced composite video signal from a recording and reproducing apparatus is applied to the terminal 14, and supplied to the synchronizing signal separating circuit 16 within the PLL 15 and the input terminal of the shift register 12 within the memory device 30 as in the first embodiment described previously. The oscillation output of the VCO 22 is applied to the clock pulse generator 22 through the switch 33. The clock pulse for horizontal transfer generated from the clock pulse generator 22 is directly supplied to the output shift register 13 and also supplied to the input shift register 12 through the switch 34. The clock pulse for vertical transfer generated from the clock pulse generator 22 is supplied to the vertical transfer parts. In this state, the clock pulse generator 22 does not generate a gate pulse for transferring the signal electric charges to the vertical transfer parts T1 through T408 from the image sensor parts P1 through P408. It is desirable to prevent light from hitting the image sensor parts, in order to prevent leakage of the signal electric charge to the vertical transfer parts from the image sensor parts. In the present embodiment, the leakage is prevented by reducing the opening of an iris of a lens system (not shown).

As in the first embodiment described before, the input video signal is serially transferred into each cell of the input shift register 12, transferred in parallel vertically by the vertical transfer parts of the main memory device body 31, and obtained serially from the output shift register 13. As a result, a composite video signal delayed by one frame period is obtained through the output terminal 24.

Next, description will be given with respect to an embodiment of a noise suppression circuit which employs the memory device shown in FIG. 1 as a one-frame delay device, by referring to FIG. 7. A one-frame delay device 40 shown in FIG. 7 comprises the memory device 10 shown in FIG. 1, PLL 15, clock pulse generator 22, and processing circuit 23. The noise suppression circuit shown in FIG. 7 has a construction which is substantially the same as that of the conventional noise suppression circuit constituted by the recursive filter. However, the noise suppression circuit shown in FIG. 7 differs from the conventional noise suppression circuit in that, according to the present embodiment, the composite video signal is delayed as it is in the form of the analog signal at the one-frame delay device 40 without being subjected to A/D and D/A conversions.

A standard system composite video signal reproduced from a recording medium is applied to an input terminal 42, and supplied to a subtracting circuits 43 and 46. The input composite video signal is subjected to subtraction at the subtracting circuit 46, with a signal obtained from a coefficient multiplier 45 which will be described hereinafter. An output of the subtracting circuit 46 is obtained through an output terminal 47, and is also supplied to the input terminal 14 of the one-frame delay device 40. The signal applied to the input terminal 14 of the one-frame delay device 40 is delayed by one frame period as described before in conjunction with FIG. 1. Hence, a one frame delayed signal is obtained through the output terminal 24, and supplied to a chrominance signal inverter 41. If the reproduced composite video signal is a video signal of the NTSC system, the phase of the chrominance subcarrier of the carrier chrominance signal differs by 180° for every frame. Accordingly, the inverter 41 is a circuit which uses a 1H-delay circuit, bandpass filter of 3.58 MHz, and the like, to match the phase of the chrominance subcarrier among frames.

A signal delayed by one frame period, that is, 525H period, at the one-frame delay device 40, and matched of the phase of the chrominance subcarrier with the phase of the input composite video signal from the input terminal 42 at the inverter 41 and delayed by 524H and 526H, is supplied to the subtracting circuit 43. The signal thus supplied to the subtracting circuit 43 is subjected to subtraction with the input composite video signal from the input terminal 42. A difference signal component among frames, which is obtained by the subtraction between the input composite video signal obtained from the subtracting circuit 43 and the one frame delayed composite video signal, comprises a noise component having no correlation among frames and a video signal difference component corresponding to the change in the video information signal component among frames. The output signal of the subtracting circuit 43 is supplied to the coefficient multiplier 45 through a movement correcting circuit 44 which will be described hereinafter. The difference signal component supplied to the coefficient multiplier 45 is multiplied by a coefficient k, where k is less than one. The weight of the averaging in terms of time, that is, the S/N ratio improvement characteristic changes according to the value of the coefficient k.

The output signal of the coefficient multiplier 45 is supplied to the subtracting circuit 46 wherein the signal supplied thereto is subjected to subtraction with the input composite video signal from the input terminal 42. According to this subtraction carried out at the subtracting circuit 46, the noise component within the input composite video signal is cancelled and suppressed. The output composite video signal thus suppressed of the noise component is obtained through output terminal 47, and supplied to the one-frame delay device 40.

Figure 7:
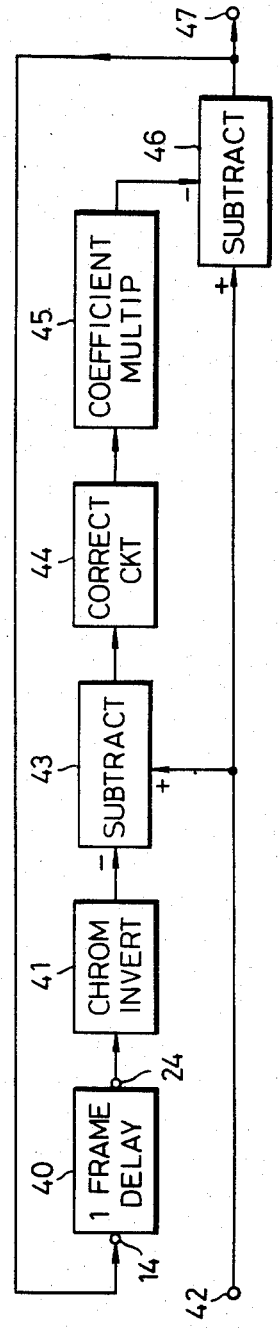
FIG. 7 is a systematic block diagram showing an embodiment of a noise suppression circuit employing the one-frame delay device shown in FIG. 1.

The nose suppression ratio of the noise suppression circuit shown in FIG. 7 is equal to $\sqrt{(1-k)/(1+k)}$. Accordingly, if the value of the coefficient k is set large, the averaging of the video signal in terms of time can be carried out sufficiently and the noise suppression ratio becomes small, that is, the improvement factor of the S/N ratio becomes large. If the input composite video signal comprises still picture information, a sufficiently high S/N ratio improvement factor can be obtained by simply setting the coefficient k to a large value. However, if the input composite video signal comprises moving picture information, an after image of the picture of the previous frame appears in the reproduced picture as the value of the coefficient k is set to a large value, and the reproduced picture becomes blurred.

Accordingly, in order to reduce the above after image, the movement correcting circuit 44 is provided as shown in FIG. 7, to variably control the value of the coefficient k in the coefficient multiplier 45. That is, the noise component within the difference signal component described before is generally obtained in the still picture, and the amplitude of the noise component is small. On the other hand, the video signal difference component within the difference signal component is obtained in the moving picture part, and the amplitude of the video signal difference component is large. Hence, the movement correcting circuit 44 detects the amplitude of the difference signal component, and sets the value of the coefficient k to a large value to sufficiently average the video signal in terms of time and improve the S/N ratio improvement factor. On the other hand, when the amplitude of the difference signal component is large, that is, when it is detected that the video signal has changed, the movement correcting circuit 44 sets the coefficient k to zero or a small value so that the change in the input signal appears as it is at the output. Hence, by variably controlling the value of the coefficient k at the movement correcting circuit 44, the S/N ratio improving operation is suppressed with respect to the moving part of the picture, to reduce the generation of blur caused by the movement in the picture.

Next, description will be given with respect to an embodiment wherein the memory device shown in FIG. 5 is applied to an image pickup sensing device and a video signal recording and/or reproducing apparatus which cooperates with the image pickup sensing device, by referring to FIG. 8. A solid-state image pickup sensor and one-frame delay device 50 is used as a solid-state image pickup sensing device and a one-frame delay device, and comprises the memory device 30, PLL 15, crystal oscillator 32, clock pulse generator 22, and processing circuit 23 shown in FIG. 5. The output terminal 24 of the device 50, is connected to a moving contact of a switch 51 which is connected to a contact a during a recording mode and connected to a contact b during a reproducing mode.

Figure 8:
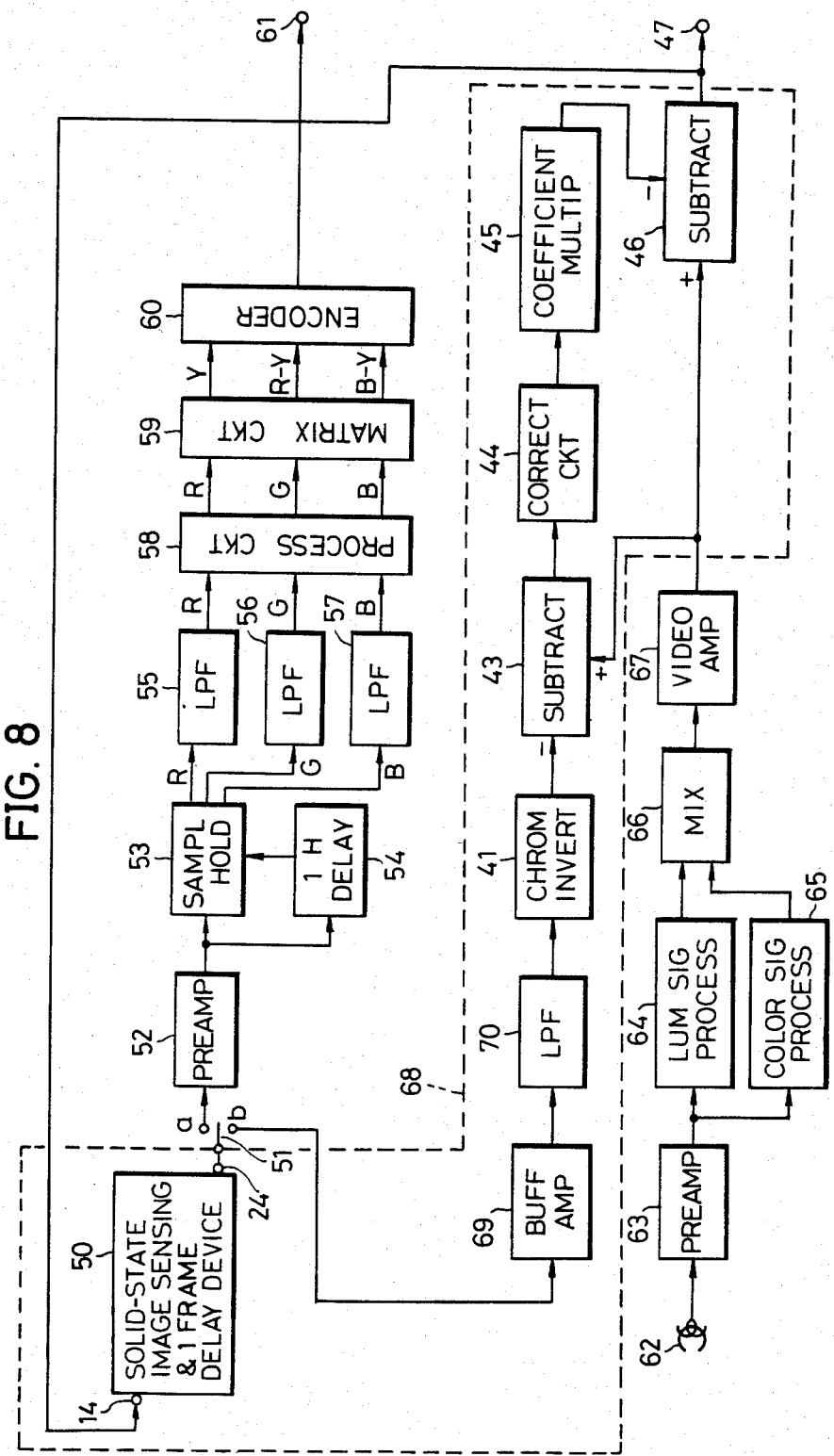
FIG. 8 is a systematic block diagram showing an embodiment of an image sensor camera applied with the device shown in FIG. 5, which is built-in with or cooperates with a recording and/or reproducing apparatus.

First, during the recording mode, the moving contact of the switch 33 shown in FIG. 5 is connected to the contact a and the switch 34 is opened as described before, and the moving contact of the switch 51 shown in FIG. 8 is connected to the contact a. In this mode, the memory device 30 operates as a solid-state image pickup sensing device as described before in conjunction with FIG. 5, and the composite video signal obtained by the image pickup at the device 50 and produced through the output terminal 24 is supplied to a preamplifier 52 through the switch 51. The composite video signal is amplified to a predetermined level at the preamplifier 25, and then supplied to a sample-and-hold circuit 53 and a 1H-delay circuit 54.

Green filters are arranged in the form of a quincunx with respect to 408×450 photoelectric converting elements of the image pickup sensor parts P1 through P408 of the main memory device body 31 shown in FIG. 6. Red and blue filters are arranged with respect to the remaining photoelectric converting elements of the main memory device body 31. Thus, an output composite video signal of the peamplifier 52 comprises red and blue signals alternately obtained for every 1H and a low-frequency signal of a green signal. The sample-and-hold circuit 53 and the 1H-delay circuit 54 constitute a circuit part which supplements the dropped out signal of 1H with a signal of the preceding 1H with respect to the above red and blue signals, and produces the low-frequency signal of the green signal after sampling and holding with respect to the green signal. As is well known, the signal corresponding to the green picture element may be alternately sampled from the low-frequency signal of the green signal and the low-frequency signal of the green signal which is delayed by 1H, to obtain a green signal of a wide frequency band. In this case, the low-frequency signal of the green signal is subtracted from the wide frequency band signal of the green signal to obtain a high-frequency signal of the green signal, and the high-frequency signal of the green signal is used instead of the high-frequency component of the luminance signal.

The red signal R, low-frequency component G of the green signal, and blue signal B obtained from the sample-and-hold circuit 53 respectively are pulse-code modulated. Hence, the the carriers of the signals from the sample-and-hold circuit 53 are eliminated by low-pass filters 55, 56, and 57. Outputs of the filters 55, 56, and 57 are respectively supplied to a processing circuit 58 wherein signal processing such as clamping of the optical black, gamma compensation, and white clipping are carried out. Three primary color signals obtained from the signal processing circuit 58 is supplied to a matrix circuit 59 and converted into a luminance signal Y and color difference signals (R-Y) and (B-Y). The output signals of the matrix circuit 59 are respectively supplied to an encoder 60 and formed into a standard system color video signal, and produced through an output terminal 61. This standard system color video signal from the output terminal 61 is passed through a recording circuit (not shown) of the recording and/or reproducing circuit and converted into a predetermined signal format, to be recorded onto a magnetic tape by a rotary head, for example.

Next, during the reproducing mode, the moving contact of the switch 33 shown in FIG. 5 is connected to the contact b and the switch 34 is closed as described before, and the moving contact of the switch 51 shown in FIG. 8 is connected to the contact b. During this reproducing mode, the memory device 30 operates as a one-frame delay device as described before in conjunction with FIG. 5. Moreover, the device 50 operates to delay the signal supplied to the input terminal 14 from the subtracting circuit 46 by one frame period.

The composite video signal reproduced from a recording medium such as a magnetic tape by a rotary magnetic head 62, is passed through a preamplifier 63 and supplied to a luminance signal processing circuit 64 and a color signal processing circuit 65. Hence, the luminance signal and the color signal component of the composite video signal are respectively returned to the luminance signal and the color signal component of the standard system at the processing circuits 64 and 65, and then mixed at a mixer 66. An output composite video signal of the mixer 66 is amplified at a video amplifier 67, and supplied to the subtracting circuits 43 and 46 of a noise suppression circuit 68 having the same circuit construction as the noise suppression circuit shown in FIG. 7.

The output signal of the subtracting circuit 46 is delayed by one frame period by the device 50, and the delayed signal obtained through the output terminal 24 is supplied to a buffer amplifier 69 through the switch 51. An output signal of the buffer amplifier 69 is passed through a lowpass filter 70 and eliminated of the unwanted frequency component, and then supplied to the inverter 41. The output of the inverter 41 is supplied to the subtracting circuit 43 as described before in conjunction with FIG. 7. Furthermore, the output of the subtracting circuit 43 is passed through the movement correcting circuit 44 and the coefficient multiplier 45, and supplied to the subtracting circuit 46. As a result, a reproduced composite color video signal suppressed of the noise, is obtained through the output terminal 47.

The semiconductors within the memory device in each of the above described embodiments are not limited to CCDs, and other charge transfer elements such as BBDs may be used. In addition, the charge transfer elements need not transfer the electric charges successively as in the case of the CCDs, and elements such as a MOS which stores at random and then reads out the stored information may be used instead.

Further, the present invention is not limited to these embodiments, but various variations and modifications may be made without departing from the scope of the present invention.

What is claimed is:

1. A video memory device comprising:
   an analog memory part in which memory elements are arranged in a matrix form with a plurality of rows and a plurality of columns for storing an input analog video signal including a time base fluctuation component, the memory elements of said analog memory part comprising transfer elements for simultaneously transferring signals in each column to a succeeding row in parallel for each of the rows;
   an input circuit for applying the input analog video signal to the analog memory part and for causing the analog memory part to store the input analog video signal, said input circuit comprising an input shift register for simultaneously transferring signals in each column to said analog memory part in parallel after serially transferring the input analog video signal for each of said columns;
   an output circuit for obtaining an analog video signal delayed by a predetermined delay time from said analog memory part, said output circuit comprising an output shift register for serially transferring signals in each column transferred in parallel from said analog memory part and producing the analog video signal delayed by said predetermined delay time;
   a clock pulse generator for generating and applying a clock pulse for horizontal transfer to said input shift register and said output shift register, and for generating and applying a clock pulse for vertical transfer to said analog memory part; and
   a phase locked loop including separating means for separating a horizontal synchronizing signal from said input analog video signal, a phase comparator supplied with the separated horizontal synchronizing signal, and a voltage controlled oscillator variably controlled of its oscillation frequency by an output error signal of said phase comparator for supplying an oscillation output to said phase comparator, said output of said voltage controlled oscillator being also supplied to said clock pulse generator to cause said clock pulse generator to generate said clock pulses.

2. A video memory device as claimed in claim 1 in which said analog memory part further comprises an image sensor part, said image sensor part comprising photoelectric converting elements forming a plurality of columns in alternate arrangement with each of said columns of said memory elements and forming a plurality of rows so that said photoelectric converting elements are arranged in a matrix form to constitute picture elements, said photoelectric converting elements transferring signals obtained by image sensing to said memory elements, and said input circuit is inoperative and said analog memory part and said output circuit are operative during an image sensing mode in which said image sensor part is used.

3. A video memory device as claimed in claim 1 which is applied to an image sensing device and recording and/or reproducing device, in which said analog memory part further comprises an image sensor part comprising photoelectric converting elements forming a plurality of columns in alternate arrangement with each of said columns of said memory elements and forming a plurality of rows so that said photoelectric converting elements are arranged in a matrix form to constitute picture elements, said photoelectric converting elements transfer signals obtained by image sensing to said memory elements, and which further comprises a reference frequency oscillator for generating a reference frequency signal, first switching means for switching and supplying the output of said reference frequency oscillator to said clock pulse generator during an image sensing mode in which said image sensor part is used and supplying the output of said voltage controlled oscillator to said clock pulse generator during a reproducing mode of said recording and/or reproducing device, and second switching means for interrupting supply of the clock pulse for horizontal transfer from said clock pulse generator to said input shift register during said image sensing mode and permitting supply of the clock pulse for horizontal transfer to said input shift register during said reproducing mode.

4. A video memory device as claimed in claim 1 in which said analog video signal is delayed by substantially one frame period and produced from said output circuit.

5. A video memory device as claimed in claim 1 in which said analog video signal is delayed by substantially one field period and produced from said output circuit.

6. A video memory device comprising:
   an analog memory part in which memory elements are arranged in a matrix form with a plurality of rows and a plurality of columns for storing an input analog composite video signal comprising a video information signal and a composite synchronizing signal, said analog memory part only storing the video information signal of said analog composite video signal;
   an input circuit for applying the video information signal to the analog memory part and causing the analog memory part to store the video information signal;
   an output circuit for obtaining a video information signal delayed by a predetermined delay time from said analog memory part; and
   a circuit for forming a composite synchronizing signal and adding this composite synchronizing signal to an analog information signal obtained from said output circuit.

7. A video memory device as claimed in claim 6 in which the memory elements of said analog memory part comprise transfer elements for simultaneously transferring signals in each columm to a succeeding row in parallel for each of the rows, said input circuit comprises an input shift register for simultaneously transferring signals in each column to said analog memory part in parallel after serially transferring the video information signal for each of said columns, and said output circuit comprises an output shift register for serially transferring signals in each column transferred in parallel from said analog memory part and producing the video information signal delayed by said predetermined delay time.

8. A video memory device as claimed in claim 7 which further comprises a clock pulse generator for generating and applying a clock pulse for horizontal transfer to said input shift register and said output shift register, and generating and applying a clock pulse for vertical transfer to said analog memory part.

* * * * *